Figure 1:
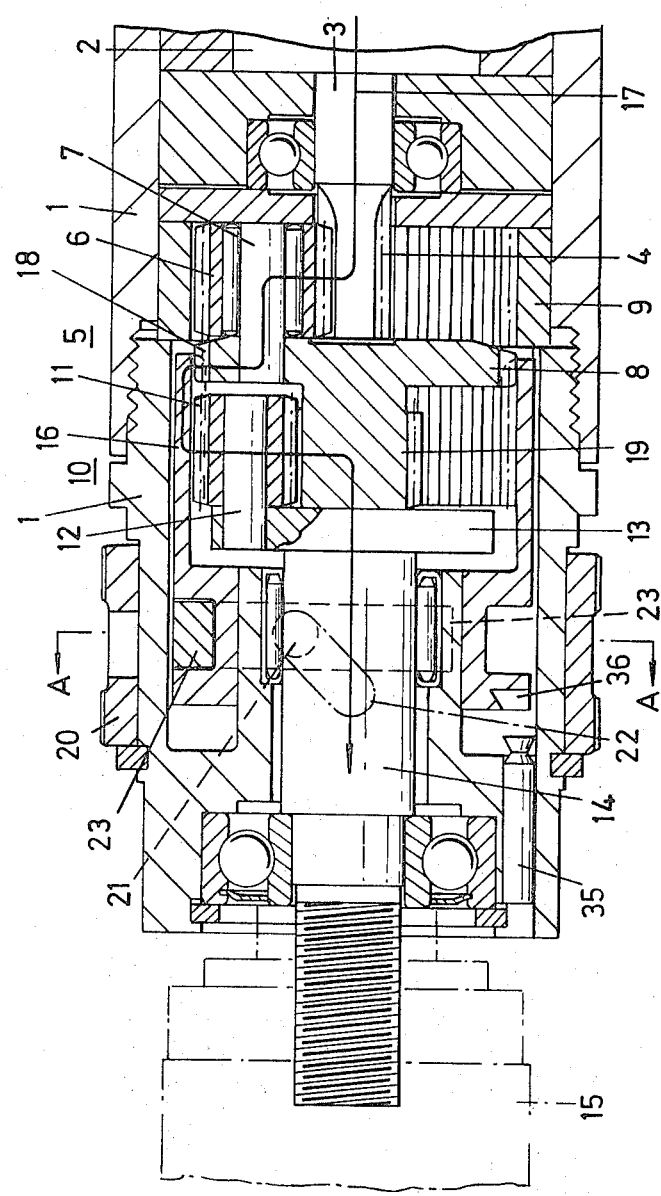

United States Patent [19]
States

[11] 3,872,742
[45] Mar. 25, 1975

[54] POWER DRIVEN ROTARY TOOL

[75] Inventor: Ronald Frederick States, London, England

[73] Assignee: Desoutter Brothers Limited, London, England

[22] Filed: Apr. 25, 1973

[21] Appl. No.: 354,164

[30] Foreign Application Priority Data
May 24, 1972 United Kingdom............ 24489/72

[52] U.S. Cl. .............................................. 74/785
[51] Int. Cl. ............................................ F16h 57/10
[58] Field of Search............................ 74/785, 768

[56] References Cited
UNITED STATES PATENTS
1,544,168  6/1925  Nolan .................................. 74/785
2,659,249  11/1953  Carr.................................... 74/785

Primary Examiner—Wesley S. Ratliff, Jr.
Attorney, Agent, or Firm—Irving M. Weiner

[57] ABSTRACT

A power driven rotary tool provided with two stages of epicyclic gears in tandem in which the internal gear around one of the stages is mounted so as to be rotatable, and movable longitudinally whilst in engagement with its associated planet gears, the internal gear being locked to the casing of the tool in one extreme longitudinal direction of movement for low speed running of the tool and is free to rotate in the other extreme longitudinal position whilst in engagement with teeth upon the planet gear carrier of one of the stages for high speed running of the tool.

6 Claims, 6 Drawing Figures

POWER DRIVEN ROTARY TOOL

THE INVENTION RELATES to a power driven rotary tool, in particular to a power driven rotary drill.

It is common practice to provide a power driven rotary drill the speed of which may be varied by multiple gearing to suit the drill and/or the material which is being worked upon, and it is the object of the present invention to provide an improved change speed mechanism for such a tool.

The invention consists in a power driven rotary tool provided with two stages of epicyclic gears in tandem upon a common axis, each gear comprising a sun gear wheel, a system of planetary gears supported for rotation upon a planet carrier and internal gear around the planet gears, characterised in that the internal gear around one of the gears is mounted so as to be rotatable and movable longitudinally of said common axis whilst remaining in engagement with its associated planet gears, said longitudinal movement being between the one extreme position where it engages abutment means which prevents rotation of the internal gear relative to the casing of the tool, and the other extreme position where the teeth on the internal gear engage teeth in one of the planet carriers, so that the latter and the internal gear rotate together, thereby providing a low and high speed rotation of the output shaft of the tool respectively.

The invention further consists in a power driven rotary tool as set forth in the preceding paragraph in which the epicyclic gear with the movable internal gear is the one further from the motor of the tool, the abutment means comprising a pin upon the body of the tool engageable in a recess in the movable internal gear, and it is the planet carrier of the gear nearer the motor which has teeth thereon.

The invention still further consists in a power driven rotary tool as set forth above in which the epicyclic gear with the movable internal gear is the one further from the motor of the tool, the abutment means comprising dogs upon the movable internal gear which are engageable with dogs upon the internal gear of the epicyclic gear nearer the motor, and it is the planet carrier of the gear further from the motor which has teeth thereon.

Figure 2:
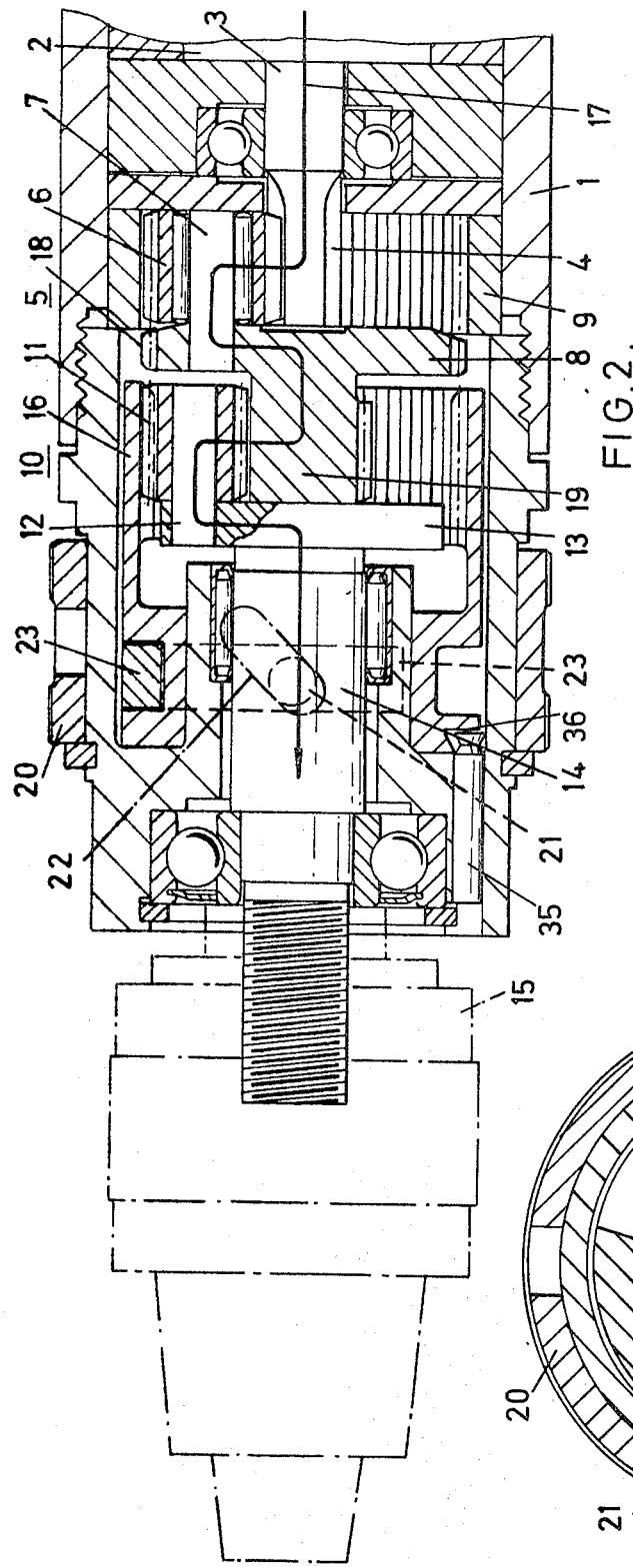
Figure 3:
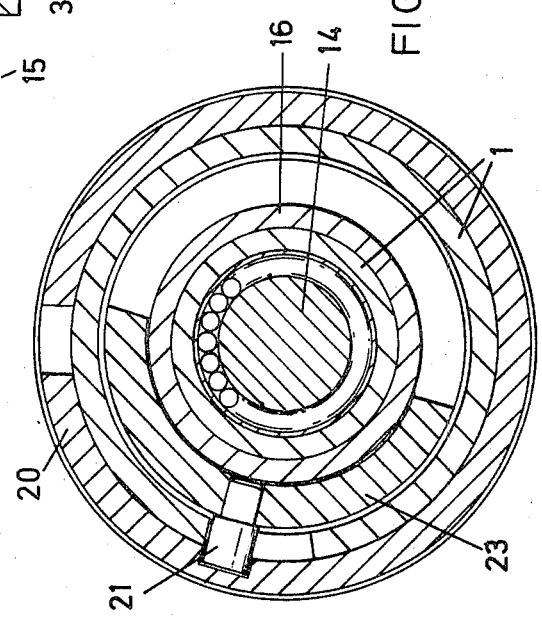
Figure 4:
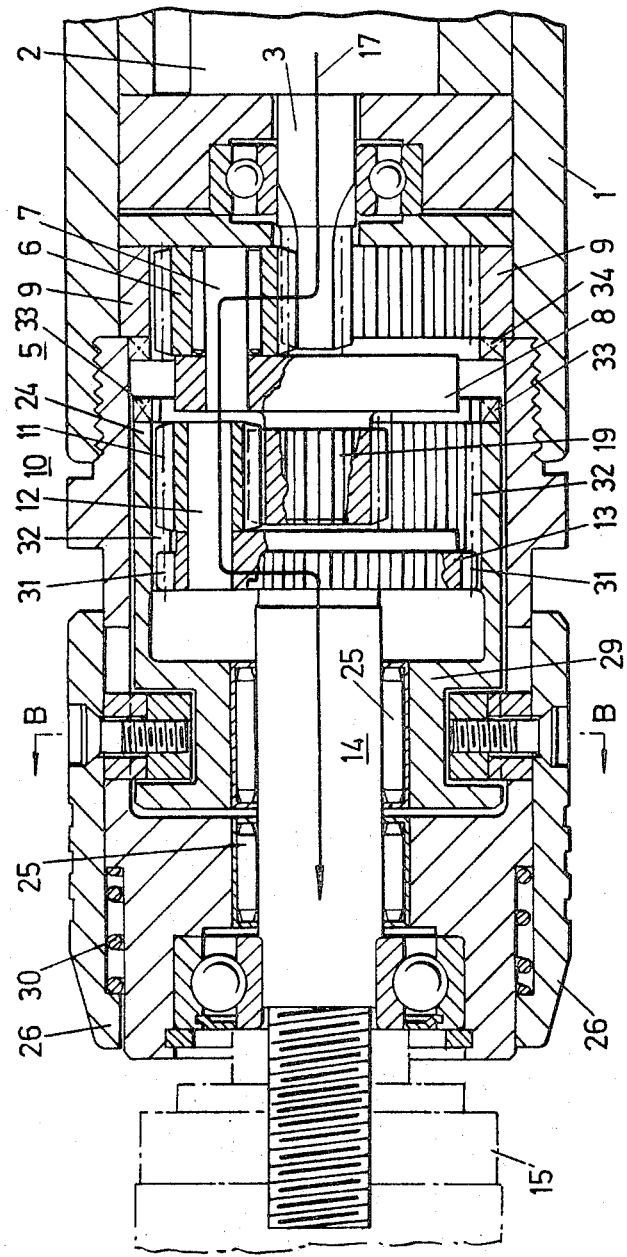
Figure 5:
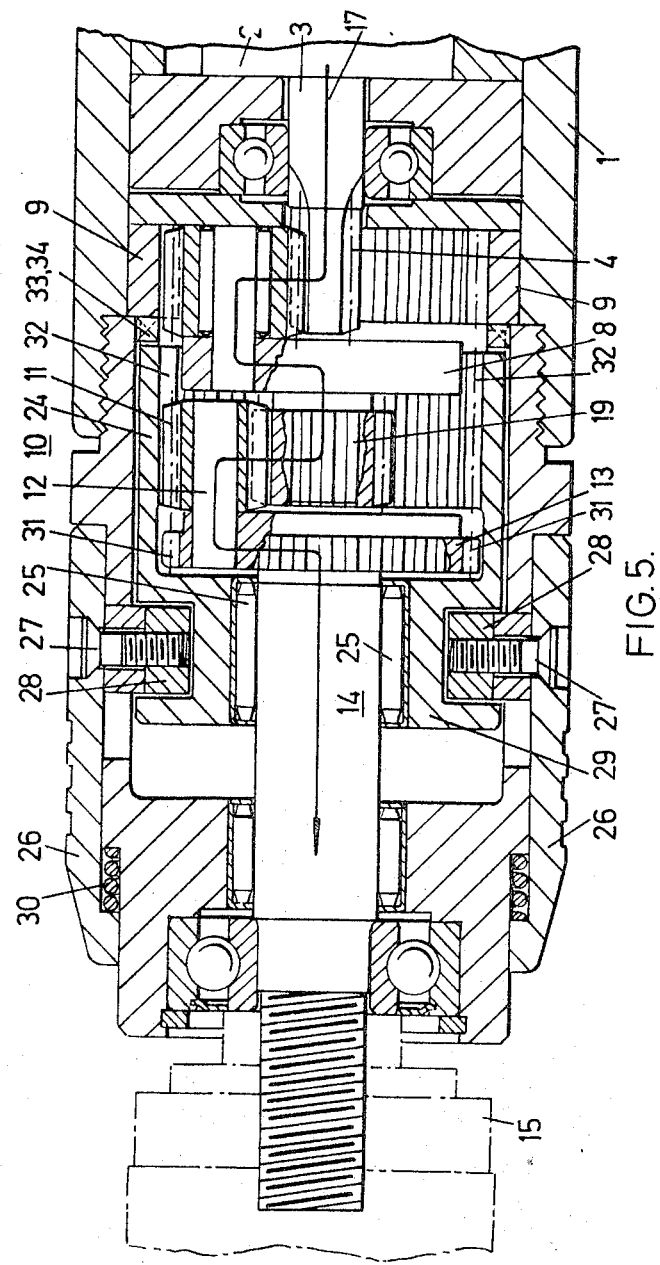
Figure 6:
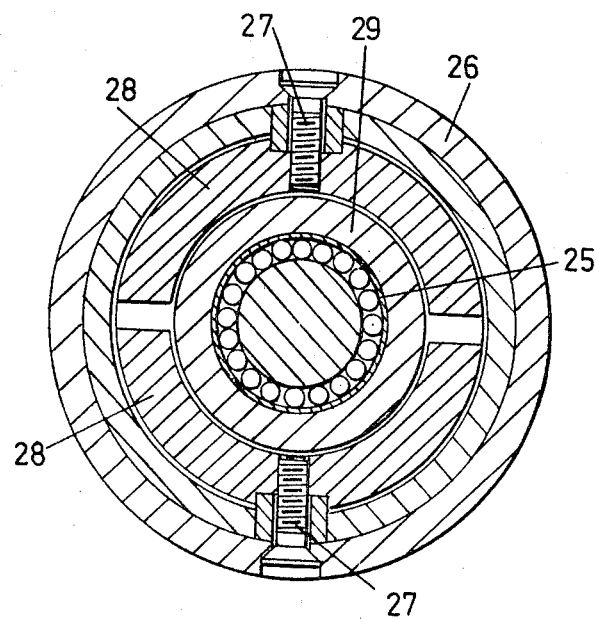

The accompanying drawings show, by way of example only, two embodiments of the invention in which, FIG. 1 is a part longitudinal section of one embodiment of the tool with the gear in the higher speed position, FIG. 2 is a part longitudinal section of the tool of FIG. 1 with the gear in the lower speed position, FIG. 3 is a cross-section on the line A — A of FIG. 1, FIG. 4 is a part longitudinal section of a further embodiment with the gears in the high speed rotation position, FIG. 5 is a part longitudinal section of the gear of FIG. 4 in the lower speed position, while FIG. 6 is a section on the lines B — B of FIG. 4.

The tool illustrated in FIG. 1 comprises an outer casing 1, which contains an electric or pneumatic motor 2, having an output shaft 3 having teeth 4 thereon which constitutes the sun gear wheel of the first epicyclic gear 5. The planet gear 6 of the first epicyclic gear 5 is rotatably supported upon a pin 7 upon a planet wheel carrier 8. The planet gear 6 engages a stationary internal gear 9 fastened to the casing of the tool in known manner and acts as a first stage epicyclic reduction gear.

The planet gear carrier 8 is provided with a sun gear wheel 19 of the second epicyclic gear 10, which is engaged by a planet gear 11 rotatably supported on a pin fastened to the planet gear carrier 13 formed as part of the drive shaft 14, to which is fastened a chuck 15.

The planet gear 11 engages an internal gear 16, which is adapted to be move longitudinally to change the gear ratio. When the internal gear 16 is in the position as shown in FIG. 2 it is held stationary by the engagement of the pin 35 in the recess 36 and the second epicyclic gear 10 is operative and the lower speed is provided to the chuck 15 by the path of power indicated by the arrowed line 17 passing through both epicyclic gears.

The carrier 8 of the epicyclic gear nearer the motor is provided with teeth 18 which are engageable by the teeth on the internal gear 16 when it is moved to the right as shown in FIG. 1. In this position the internal gear 16 is in engagement both with the plantary gear 11 and the carrier 8, and consequently the epicyclic gear further from the motor is locked and the power follows the path shown by the arrowed line 17 of FIG. 1.

A manually operable ring 20 is provided around the casing, which has a slot in which is positioned a pin 21, which passes through a helical slot 22 in the wall of the casing 1, and is engaged in an arcuate shoe 23 positioned in a circumferential groove in the internal gear 16. When the ring 20 is rotated in a clockwise direction as viewed from the rear of the tool, the epicyclic gear further from the motor is locked and the high speed ratio is obtained. This condition is maintained due to the frictional force on the shoe 23, tending to bias the pin 21 towards the rear end of the helical slot. When the ring 20 is rotated in an anti-clockwise direction, the stage of the gear further from the motor is rendered operative resulting in a further speed reduction, while this position is again maintained by frictional force on the shoe 23 tending to keep the said ring gear captive.

In the construction of FIGS. 1, 2 and 3 the gear is in the high speed condition when the internal gear 16 is in the rearward position, and the gear 10 is locked, while in the construction of FIGS. 4, 5 and 6, the gear is in the low speed condition when the internal gear 24 is in the rearward position, and the internal gear 24 is prevented from rotating and the gear 10 is operative.

The internal gear 24 is mounted upon bearings 25 upon the drive shaft 14, so as to be slidable from the normal high speed position of FIG. 4 to the low speed position of FIG. 5, by reason of being provided with a manually operable slidable sleeve 26 fastened by the screws 27 to the arcuate shoes 28 in a circumferential groove in the portion 29 of the internal gear 24. The sleeve is urged in the direction of the chuck 15 by the springs 30, so as to be normally in the high speed condition.

The planet gear carrier 13 of the epicyclic gear 10 is provided with teeth 31 which are engageable with the teeth 32 on the gear 24 which engage the teeth 11 on the planet wheel and the teeth are of such length that when the sleeve 26 is in the forward position they also engage the teeth 31 on the planet wheel carrier 13, and the gear 10 is therefore locked and rendered inoperative, as shown in FIG. 4 and the internal gear 24 rotates and the drive is by way of the line 17 and a high speed condition produced.

The internal gear 24 is also provided with dogs 33 which are engageable with dogs 34 on the stationary internal gear 9 of the gear 5 when the internal gear 24 is moved to the rearward position as shown in FIG. 5, after the forward ends of the teeth 32 become disengaged from the teeth 31, with the result that the internal gear 24 is held stationary and thereby the gear 10 becomes operative and a low speed is adopted and the drive is by way of the line 17 of FIG. 5.

This high speed operation is maintained so long as the manually operable sleeve 26 is held away from the chuck 15, but the high speed condition is restored as soon as this sleeve is released due to the action of the spring 30.

The two embodiments vary in that the direction of longitudinal movement of the internal gear of the gear further from the motor to change from one ratio to the other ratio of the drive, is the opposite, while the teeth are provided on different planet carriers.

It is to be understood that the above description is by way of example only, and that details for carrying the invention into effect may be varied without departing from the scope of the invention.

I claim:

1. A power driven rotary tool provided with two stages of epicyclic gears in tandem upon a common axis, each gear comprising a sun gear wheel, a system of planetary gears supported for rotation upon a planet carrier and an internal gear around the planet gears, characterised in that the internal gear around one of the gears is mounted so as to be rotatable and movable longitudinally of said common axis whilst remaining in engagement with its associated planet gears, said longitudinal movement being between the one extreme position where it engages abutment means which prevents rotation of the internal gear relative to the casing of the tool, and the other extreme position where the teeth on the internal gear engage teeth in one of the planet carriers, so that the latter and the internal gear rotate together, thereby providing a low and high speed rotation of the output shaft of the tool respectively.

2. A power driven rotary tool as claimed in claim 1, in which the epicyclic gear with the movable internal gear is the one further from the motor of the tool, the abutment means comprising a pin upon the body of the tool engageable in a recess in the movable internal gear, and it is the planet carrier of the gear nearer the motor which has teeth thereon.

3. A power driven rotary tool as claimed in claim 2, in which the longitudinal movement of the internal gear is effected by the manual circumferential rotation of a sleeve around the casing of the tool.

4. A power driven rotary tool as claimed in claim 3 in which the rotary motion of the sleeve is converted into a longitudinal movement of the internal gear by the action of a radial pin on the sleeve passing through a helical slot in the wall of the casing of the tool and engaging an arcuate shoe positioned in a circumferential groove in the internal gear.

5. A power driven rotary tool provided with two stages of epicyclic gears in tandem upon a common axis, each gear comprising a sun gear wheel, a system of planetary gears supported for rotation upon a planet carrier and an internal gear around the planet gears, characterised in that the internal gear around one of the gears is mounted so as to be rotatable and movable longitudinally of said common axis whilst remaining in engagement with its associated planet gears, said longitudinal movement being between the one extreme position where it engages abutment means which prevents rotation of the internal gear relative to the casing of the tool, and the other extreme position where the teeth on the internal gear engage teeth in one of the planet carriers, so that the latter and the internal gear rotate together, thereby providing a low and high speed rotation of the output shaft of the tool respectively;

The longitudinal movement of the internal gear being effected by the manual longitudinal movement of a sleeve round the casing of the tool against the action of a spring;

the sleeve around the casing of the tool being fastened to an arcuate shoe positioned in a circumferential groove in the internal gear by bolts passing through longitudinal slots in the casing.

6. A power driven rotary tool as claimed in claim 5, in which the epicyclic gear with the movable internal gear is the one further from the motor of the tool, the abutment means comprising dogs upon the movable internal gear which are engageable with dogs on the internal gear of the epicyclic gear nearer the motor, and it is the planet carrier of the gear further from the motor which has the teeth thereon.

* * * * *